United States Patent [19]

Gyann

[11] Patent Number: 4,764,384

[45] Date of Patent: Aug. 16, 1988

[54] METHOD OF FILTERING SPENT COOKING OIL

[75] Inventor: John Gyann, Darien, Ill.

[73] Assignee: GyCor International Ltd., Bridgeview, Ill.

[21] Appl. No.: 847,644

[22] Filed: Apr. 3, 1986

[51] Int. Cl.[4] .................................................. A23D 5/02

[52] U.S. Cl. .................................... 426/417; 260/428; 426/423

[58] Field of Search ........................ 426/423, 417, 271; 260/428; 99/408

[56] References Cited

U.S. PATENT DOCUMENTS 3,099,626 7/1963 Riede .................................. 210/777
4,112,129 9/1978 Duensing et al. .................... 426/423
4,330,564 5/1982 Friedman ............................ 426/423

*Primary Examiner*—George Yeung
*Attorney, Agent, or Firm*—Burmeister, York, Palmatier, Hamby & Jones

[57] ABSTRACT

A filtering media for use with edible liquids consisting of 80 percent synthetic amorphous silica, 10 percent synthetic amorphous magnesium silicate, 9 percent diatomaceous earth, and 1 percent synthetic amorphous silica-alumina. The process of rejuvenating spent cooking oil by admixing the filtering media in the spent cooking oil, maintaining the mixture at a temperature of 275° F. for a period of about five minutes, and filtering the mixture to remove particulate matter including the filtering media.

4 Claims, No Drawings

METHOD OF FILTERING SPENT COOKING OIL

The present invention relates to filtering media and to processes for using such filtering media, particularly for rejuvenating cooking oils used for deep fat frying in fast food restaurants, and for removing undesirable taste constituents from wine.

BACKGROUND OF INVENTION

One of the conventional cooking processes is to fry food items in a body of boiling fat or cooking oil. Sliced potatoes, zucchini, chunks of fish, chicken, shrimp, and the like, may be cooked in this manner in a relatively short time making the process attractive to a fast food restaurant operation. The continuous use of such deep fat fryers, however, cause the oil to be both depleted and contaminated. Merely adding fresh cooking oil is not sufficient to maintain the cooking oil in usable condition.

Spent cooking oil from a deep fat fryer contains various contaminants. Parts of the food product break off during cooking and remain in the cooking oil. Many food products such as fish, chicken, shrimp, zucchini and mushrooms are coated with a seasoned coating prior to immersion in the cooking oil, and particles of the coating break free from the product and remain in the cooking oil. In addition, fat from the food product itself will comingle with the cooking oil and through continuous use the cooking oil will produce contaminants.

It is customary in fast food restaurants to filter the cooking oil at the end of the day. Larger fryers, such as the gas fired fifty pound fryers in conventional use, are provided with drains, and the spent cooking oil is drained from the fryer through a paper filter and into a container. The paper filter will permit the spent oil to pass through the filter but will filter out most particles to produce a substantially particle free oil which is then pumped back into the fryer. Smaller fryers may simply be dumped through a paper cone supported in a nylon bag, the spent oil being collected in a container and returned to the fryer. Merely filtering the spent cooking oil will not remove contaminants except particulate matter.

Cooking oils may be either animal or vegetable in origin. Historically, pork fat has been rendered to produce a lard or cooking oil. Other types of animal fat also can be used for cooking oil. In recent years, various types of vegetable oils have become widely used, such as soybean, cottonseed, rapeseed, peanut, olive, and palm oil. In addition, fish oil has had wide applications in the food industry.

Many of these oils require processing in order to remove flavoring substances or coloring agents. The removal of free fatty acids is one of the purposes of refining crude oils. Various processes for refining crude oils are described in a paper by T. K. Magg entitled Clay-Heat Refining of Edible Oils presented in September 1972 at a symbosium entitled Processing of Edible Oils, AOCS Meeting, Ottawa, Canada. The basis of refining crude oils described in the Magg paper is to remove free fatty acids by deodorization, but to remove prior to deodorization those substances that interfere with satisfactory deodorization, either by pretreating the crude oil with phosphoric acid and bleaching the crude oil or some other process.

While deodorization is a process which may be carried out readily in an oil processing plant, it is not a process which may be utilized readily by a restaurant. Further, the processes for treating crude edible oils may not be effective on spent edible oils, since contaminants have been introduced into the oil from the substances being cooked and the cooking process. Accordingly, it is an object of the present invention to provide a process for rejuvenating spent cooking oil, and to provide such a process which does not require additional equipment beyond the filters already in use, which is not cumbersome, complicated or costly.

The present inventor has found that spent cooking oil may be rejuvenated by directly adding a filtering media to the spent cooking oil in the fryer. The filtering media contains particles of material which become uniformly distributed in suspension throughout the liquid body of the spent cooking oil, and the particles of filtering media material are effective to absorb contaminants and bleach the spent cooking oil to extend the useful life of that cooking oil. The most effective absorption and bleaching action produced by the filtering media occurs when the cooking oil and filtering media are hot, such as 275° F. The filtering media will assume the same temperature of the cooking oil relatively quickly after being added thereto, and the fryer is maintained in operation for a sufficient period of time to permit the filtering media to substantially complete absorbing of the contaminants in the spent cooking oil and bleaching of the cooking oil.

The present invention also contemplates a new and novel filtering media particularly effective for use in rejuvenating spent cooking oil according to the process outlined above. A blend of silicate compounds is provided to collectively achieve the necessary filtering actions for renewing spent cooking oil. The filtering media contains synthetic amorphous silica with absorbed moisture, synthetic amorphous magnesium silicate, diatomaceous earth and synthetic amorphous silica-alumina. Synthetic amorphous silica through absorption and polar attraction will remove trace metals (ligands), thermal and oxidative polymers, alcohols, ketones, aldehydes, acidic and basic compounds, and miscellaneous residual impurities which cause off-odors, off-flavors, and off-colors in spent cooking oil. Synthetic amorphous magnesium silicate will remove acidic compounds, polar compounds, color and odor bodies through absorption. Diatomaceous earth absorbs color bodies and miscellaneous residual impurities. In addition, diatomaceous earth can be provided in relatively large particle size and particle shapes which will facilitate faster filtration. Synthetic amorphous silica-alumina absorbs polar compounds and volatile compounds such as aldehydes and ketones. Synthetic amorphous silica also is obtainable in relatively large particle size to provide faster filtration. The particle size for diatomaceous earth and synthetic amorphous silica-alumina is 20–25 microns in diameter, synthetic amorphous silica and synthetic amorphous magnesium silicate being considerably finer.

The filtering media described above is also effective in refining other edible liquids, particularly wine. The filtering media may be admixed with wine to absorb and attract undesirable taste constituents and to bleach the wine to improve the color and palatability of the wine.

DETAILED DESCRIPTION OF INVENTION

In a preferred embodiment, the filtering media consists of 80% synthetic amorphous silica with absorbed moisture, 10% synthetic amorphous magnesium silicate, 9% diatomaceous earth, and 1% synthetic amorphous silica-alumina by weight. Even though 80% of the media comprises synthetic amorphous silica, the filtering media will not be efficient if only synthetic amorphous silica is employed. Additional materials are necessary for the removal of free fatty acids and proper bleaching of the spent cooking oil, and also to provide a sufficiently granular structure to achieve adequate flow rates through the filter.

The following specific example will illustrate the manner in which the filtering media consisting of 80% synthetic amorphous silica with absorbed moisture, 10% synthetic amorphous magnesium silicate, 9% diatomaceous earth, and 1% synthetic amorphous silica-alumina by weight is employed to rejuvenate spent cooking oil. The cooking oil comprises 50 pounds of refined pork cooking fat which has been used for a period of 12 hours to deep fat fry strips of potatoes and thinly breaded fish filets. The cooking oil is disposed in a deep fat fryer which is provided with a gas burner to maintain the temperature of the fryer and a drain at the bottom of the fryer for removal of the cooking oil. The gas burner is regulated to maintain the cooking oil at a temperature of 275° F. At the end of the day's cooking, before shutting down the fryer, one pound of filtering media is added to the spent cooking oil in the fryer and permitted to mix in the cooking oil. The filtering media consists of synthetic amorphous silica with absorbed moisture, synthetic amorphous magnesium silicate, diatomaceous earth and synthetic amorphous silica-alumina in the proportions indicated above, and the diatomaceous earth and the synthetic amorphous silica have particle sizes of 20 microns in diameter. The slurry formed by the filtering media and spent cooking oil consists of the cooking oil, the filtering media, particulate contaminants and oils added by the cooking process during the day, and this slurry is maintained at a temperature of approximately 275° F. for a period of about 5 minutes.

The synthetic amorphous silica-alumina may be omitted from the filtering media and still provided a suitable filtering media, but inferior to one described above.

Thereafter, the slurry is drained from the fryer, and passed through a paper filter into a container. The paper filter stops all particulate matter from passing through to the container, thus trapping the filtering mixture, and particles of food left in the spent cooking oil from the cooking process, and the like. The cooking oil which collects in the container after filtration is thus substantially free of particulate matter, and also, through absorption and polar attraction, the rejuvenated cooking oil is now free of most contaminants. In addition, the color of the spent cooking oil has been lightened in the rejuvenated oil by the bleaching action of the filtering media.

The inventor has found that the useful life of animal fat cooking oils used in a fast food restaurant may be extended by the use of the filtering media to approximately twice the period of time that that cooking oil may be used when merely filtered by a paper filter in the absence of the above described filtering media.

One of the advantages of the specific filtering media utilized in the process above is that the filtration rate may be set by changing the size of the particles of diatomaceous earth and synthetic amorphous silica-alumina. It is not necessary to add a filter aid in order to achieve a suitable flow rate, and hence the disadvantages of excess and unusable bulk have been avoided.

The filter media, while particularly suitableto processing spent cooking oil, also may be utilized in other food processes. The media may be utilized to refine wine and remove undesirable taste elements from the wine. Most of the beverage wines can be improved as to taste by removing certain of the constituents of the wine which adversely affect the taste. More specifically, fine wine contains the right proportion of sugar and acidity to improve with aging. The grapes which produce this wine are said to have breed.

Beverage wine lacks the right proportion of free acids and esters, even though the wine may have good color and proper alcohol content.

The inventor has found that beverage wine can be greatly improved by absorbing some of the free acids in the wine and the color can be further improved by bleaching. After the wine has been fermented and the wine making process completed except for bottling, a filtering media may be added to the wine and permitted to remain in suspension in the wine for a period of time to absorb and remove by polar attraction some of the constituents of the wine left by the fermentation process. The wine may then be filtered through a filter paper to remove the filtering media and any solid particles in the wine to produce a wine product much nearer to a fine wine. The wine must be kept at a sufficiently low temperature to avoid deterioration of the wine, namely between 50° and 75° F., and the filtering media should remain in contact with the wine for a period from one hour to one day.

Specifically, the inventor has added 0.5 pounds of a filtering media to a liquid mass of wine weighing 5 pounds housed within a closed cask at room temperature of approximately 67° F. The filtering media consisted of 65% synthetic amorphous silica with absorbed moisture, 5% synthetic amorphous magnesium silicate, 30% diatomaceous earth. The filtering media remained in the wine for a period of ten minutes, and the wine was thereafter drained from the cask through a filter paper to remove the filtering media and any solid materials in the wine. The wine was found to have a slightly lighter color than prior to admixture with the filtering media, and to taste smoother than previously.

Those skilled in the art will devise many other applications for the present invention, including many additional uses for the filtering media here disclosed. It is therefore intended that the scope of the present invention be not limited by the foregoing specification, but only by the appended claims.

The invention claimed is:

1. The method of rejuvenating spent cooking oil containing contaminants from a cooker comprising the steps of retaining the cooking oil in the cooker, admixing with the cooking oil a filtering media comprising synthetic amorphous silica provided with moisture, synthetic amorphous magnesium silicate, and diatomaceous earth, to form a slurry of cooking oil, contaminants and filtering media, thereafter maintaining the temperature of the slurry above 100° F. for a period of about five minutes to transfer a portion of the contaminants from the cooking oil to the filtering media, and thereafter draining the slurry from the cooker through a filter to remove the filtering media with contaminants from the cooking oil.

2. The method of rejuvenating spent cooking oil containing contaminants comprising the steps of claim 1 wherein the filtering media includes synthetic amorphous silica-alumina and consists of 80 percent synthetic amorphous silica, 10 percent synthetic amorphous magnesium silicate, 9 percent diatomaceous earth, and 1 percent synthetic amorphous silica-alumina by weight.

3. The method of rejuvenating spent cooking oil containing contaminants comprising the steps of claim 2 wherein the synthetic amorphous silica-alumina and diatomaceous earth have particle sizes between 20 and 25 microns.

4. The method of rejuvenating spent cooking oil containing contaminants comprising the steps of claim 2 wherein the the slurry is maintained at a temperature of about 275° Fahrenheit for a period of five minutes.

* * * * *